(12) United States Patent
Terae et al.

(10) Patent No.: US 8,386,862 B2
(45) Date of Patent: Feb. 26, 2013

(54) FAULT DIAGNOSIS APPARATUS AND FAULT DIAGNOSIS METHOD OF MULTI-CHANNEL ANALOG INPUT/OUTPUT CIRCUIT

(75) Inventors: Hisashi Terae, Hitachi (JP); Masakazu Ishikawa, Hitachi (JP); Yasuyuki Furuta, Tokai (JP); Katsumi Yoshida, Hitachi (JP); Atsushi Nishioka, Hitachi (JP); Yasuhiro Kiyofuji, Hitachi (JP); Takenori Kasahara, Tokai (JP); Syuichi Nagayama, Hitachi (JP); Fujiya Kawawa, Mito (JP); Manabu Kubota, Hitachi (JP); Tatsuyuki Ootani, Hitachi (JP); Hidechiyo Tanaka, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 12/707,938

(22) Filed: Feb. 18, 2010

(65) Prior Publication Data

US 2010/0235699 A1 Sep. 16, 2010

(30) Foreign Application Priority Data

Mar. 6, 2009 (JP) ................................. 2009-054194

(51) Int. Cl.
| | |
|---|---|
| *G01R 31/28* | (2006.01) |
| *G01R 27/28* | (2006.01) |
| *G01R 31/00* | (2006.01) |
| *G01R 31/14* | (2006.01) |
| *H03M 13/00* | (2006.01) |
| *H04L 1/00* | (2006.01) |
| *G08C 25/00* | (2006.01) |
| *G06F 11/00* | (2006.01) |
| *G06F 11/22* | (2006.01) |
| *G06F 17/50* | (2006.01) |

(52) U.S. Cl. ........ 714/724; 714/799; 702/117; 702/118; 702/126; 716/136

(58) Field of Classification Search .................. None
See application file for complete search history.

(56) References Cited

U.S. PATENT DOCUMENTS 7,046,180 B2   5/2006   Jongsma et al.

FOREIGN PATENT DOCUMENTS

CN            1947341 A       4/2007

(Continued)

OTHER PUBLICATIONS

IEC 61508-1~7, Functional Safety of Electrical/Electronic/Programmable Electronic Safety-Related Systems, part 1~part 7, ; International Electrotechnical Commission, Geneva, Switzerland; Dec. 1998. (in Japanese with English language translation).

(Continued)

*Primary Examiner* — Guerrier Merant
(74) *Attorney, Agent, or Firm* — Antonelli, Terry, Stout & Kraus, LLP.

(57) ABSTRACT

A fault diagnosis apparatus and method capable of simultaneously detecting the fault of a multiplexer and the fault of an A/D converter and isolating and identifying causes of these faults, the multiplexer and the A/D converter being used in a multi-channel analog input/output circuit. Test-voltage values are inputted from a diagnosis-voltage input unit into the multiplexer and the A/D converter constituting an analog-signal conversion unit, the multiplexer having plural channels, the A/D converter converting outputs from the multiplexer into digital signals, the test-voltage values being different from each other for each channel of the multiplexer. Comparisons are made between the digital voltage values and the test-voltage values inputted, the digital voltage values being outputted for each channel of the multiplexer. From this comparison result, it is judged whether the multiplexer is at fault or the A/D converter is at fault.

4 Claims, 6 Drawing Sheets

FOREIGN PATENT DOCUMENTS

| | | |
|---|---|---|
| JP | 01-101020 | 4/1989 |
| JP | 06-224760 | 8/1994 |
| JP | 08-330959 | 12/1996 |
| JP | 2004-228928 | 8/2004 |
| JP | 2007-285764 | 11/2007 |
| JP | 2009-017359 | 1/2009 |

OTHER PUBLICATIONS

Office Action in JP 2009-054194, mailed May 10, 2011 (in Japanese, 2 pgs).

Office Action in CN 201010117432.2, issued Feb. 23, 2012 (in Chinese, 5 pgs), with English language translation [3 pgs].

FIG.6A

| CHANNEL | BIT STRING | DIGITAL VOLTAGE VALUE | TEST-VOLTAGE VALUE |
|---|---|---|---|
| 0 | 0001111110100000 | 4000 | 0.5V |
| 1 | 0100001011000000 | 4800 | 1.0V |
| --- | --- | --- | --- |
| 14 | 1111101101100000 | 15200 | 7.5V |
| 15 | 1111111010000000 | 16000 | 8.0V |

601

NORMAL STATE

FIG.6B

| CHANNEL | BIT STRING | DIGITAL VOLTAGE VALUE | TEST-VOLTAGE VALUE |
|---|---|---|---|
| 0 | 0000100010000000 | 1952 | 0.5V |
| 1 | 0000111110100000 | 4800 | 1.0V |
| --- | --- | --- | --- |
| 14 | 1100001101100000 | 13152 | 7.5V |
| 15 | 1100011010000000 | 13952 | 8.0V |

← BIT-STUCK IS DETECTED (0-STUCK)

602

ABNORMALITY JUDGMENT STATE

FAULT DIAGNOSIS APPARATUS AND FAULT DIAGNOSIS METHOD OF MULTI-CHANNEL ANALOG INPUT/OUTPUT CIRCUIT

BACKGROUND OF THE INVENTION

The present invention relates to an apparatus and method for performing the fault diagnosis of a multi-channel analog input/output circuit used in a Programmable Logic Controller.

DESCRIPTION OF THE RELATED ART

In process facilities whose potential danger is high, such as an atomic power plant and chemical plant, countermeasures against the potential danger are taken. These actions are taken in order to reduce the influences which will be exerted on workers and peripheral environments of the facilities in the very occurrence of a highly-unlikely accident. These countermeasures include not only passive countermeasures by protection facilities such as a segregation wall, but also active countermeasures using safety apparatuses such as an emergency halt apparatus.

Of these countermeasures, conventionally, control units for the safety apparatuses have been implemented using electro-magnetic/mechanical units such as a relay. In recent years, however, there has occurred a rise in the needs of utilizing programmable control appliances as the control units for the safety control systems. This rise has appeared in accompaniment with the development of technologies in these programmable control appliances the representative of which is a Programmable Logic Controller (PLC).

IEC 61508, which is described in IEC 61508-1 to 7, "Functional safety of electrical/electronic/programmable electronic safety-related systems" part 1 to part 7, is the international standard issued in answer to the growing trend as described above. The IEC 61508 specifies the requirements in the case where the electrical/electronic/programmable electronic control appliances are utilized as partial components of the safety control systems. Namely, the IEC 61508, which defines SIL (: Safety Integrity level) as the scale for capability of a safety control system, specifies the requested items in grades corresponding to levels of 1 to 4. The IEC 61508 indicates that, the higher the SIL becomes, the larger an extent becomes at which the potential danger owned by a process facility can be reduced. Namely, these levels of the SIL mean with what extent of certainty a predetermined safety control can be carried out when an abnormality of a process facility is detected.

At the time of the occurrence of an abnormality of a process facility, a safety control apparatus utilized therein is requested to activate immediately, even if the apparatus is inactivated in its normal operation state. This request makes it important for the apparatus to perform the self-diagnosis always, and to continue to check its own integrity. Also, the safety control system, which is requested to exhibit the higher SIL, is required to carry out the wide-range and high-accuracy self-diagnosis. This self-diagnosis is required in order to minimize a probability that the system will be down due to an undetected fault.

Moreover, the IEC 61508 introduces self-diagnosis techniques. Here, each of these self-diagnosis techniques is applied on each type basis of element components which constitute a safety control apparatus. Also, the IEC 61508 indicates the effectiveness of each self-diagnosis technique in the form of its diagnostic coverage. Here, the diagnostic coverage shows a ratio of faults which, of all the faults in each element component, are made detectable when the corresponding self-diagnosis technique is employed.

Also, as the fault detection method for an analog input/output apparatus, i.e., one of the element components of the PLC, the following method is employed: Namely, the fault is detected by using a method whereby a fault-detecting circuit is provided separately, i.e., the method whereby the circuit is duplexed. For example, in order to diagnose the fault of a multiplexer connected to an A/D converter, the following method is proposed: The multiplexer is duplexed, then diagnosing the fault of the multiplexer by making the comparison between outputs therefrom (refer to, e.g., JP-A-1-101020).

Also, the following method is proposed: Namely, when detecting the fault of an A/D converter, a multiplexer is provided before the A/D converter. Moreover, the fault diagnosis of the A/D converter is performed by connecting inputs into this multiplexer to the power-supply voltage and ground voltage (refer to, e.g., JP-A-8-330959).

Furthermore, the proposal is also made concerning a method of making a failure/no-failure judgment on an A/D converter whose externally-installed circuit is made unnecessary. Namely, test voltages ranging from a low voltage to a high voltage are prepared, then outputting these test voltages as A/D conversion signals. Moreover, the failure/no-failure judgment on the A/D converter is made based on these outputted test values (refer to, e.g., JP-A-2007-285764).

Also, the following method is proposed: Namely, a plurality of test patterns (i.e., test modes) are generated. Next, analog signals to be inputted are switched to the test-pattern signals, then being supplied to an analog processing unit which includes an A/D converter. Moreover, the fault of an analog/digital mixed circuit is detected based on digital signals for the test-pattern signals outputted from the A/D converter (refer to, e.g., JP-A-2004-228928).

SUMMARY OF THE INVENTION

In the technologies disclosed in JP-A-1-101020, JP-A-8-330959, JP-A-2007-285764, and JP-A-2004-228928 described above, it is possible to detect the fault of the multiplexer, or the fault of the A/D converter. In these technologies, however, it is impossible to simultaneously detect the faults of these two components, and further, to isolate and identify causes of these faults on the basis of this simultaneous detection.

In the technology disclosed in, e.g., JP-A-8-330959, there has existed a problem that there occurs a case where even the existence of the fault cannot be detected. Concretely, this case corresponds to a case where one and the same voltage value is inputted into among the respective channels of the multiplexer, and in particular, a case where a fault occurs in an input selection signal itself. Namely, the fault diagnosis methods disclosed in JP-A-1-101020, JP-A-8-330959, JP-A-2007-285764, and JP-A-2004-228928 have found it impossible to ensure and provide sufficient functional safety for a system which is requested to exhibit the high fault-diagnosis detection coverage.

It is an object of the present invention to provide a fault diagnosis apparatus and a fault diagnosis method capable of simultaneously detecting the fault of a multiplexer and the fault of an A/D converter, and further, isolating and identifying causes of these faults, the multiplexer and the A/D converter being used in a multi-channel analog input/output circuit.

In order to solve the above-described problem, and to accomplish the object of the present invention, a fault diagnosis apparatus for a multi-channel analog input/output circuit according to the present invention includes a signal source for generating and transmitting plural types of signals, a first switching circuit having at least two or more switches, the signals from the signal source being supplied to the switches, an analog-signal conversion unit to which the outputted signals from the signal source are supplied via the first switching circuit, and a diagnosis-voltage input unit into which test voltages are inputted.

Namely, the fault diagnosis apparatus according to the present invention is constituted by the analog-signal conversion unit and the diagnosis-voltage input unit, wherein the analog-signal conversion unit includes a multiplexer to which the outputted signals from the signal source are supplied via the first switching circuit, the multiplexer having channels whose number is equal to the number of the plural switches that the first switching circuit has, an analog/digital converter to which signals from the multiplexer are supplied, and an output processing circuit to which outputs from the analog/digital converter are supplied.

Also, the diagnosis-voltage input unit includes a test-voltage input circuit, a digital/analog converter to which the test voltages from the test-voltage input circuit are supplied, a demultiplexer to which analog signals from the digital/analog converter are supplied, the demultiplexer having plural output channels, and a second switching circuit having switches connected to the demultiplexer, number of the switches being equal to at least number of the output channels of the demultiplexer. Moreover, when the fault diagnosis is performed, analog test voltages from the demultiplexer are supplied as inputs into the respective channels of the multiplexer of the analog-signal conversion unit via the respective switches of the second switching circuit.

Also, a fault diagnosis method for a multi-channel analog input/output circuit according to the present invention includes a signal source for generating and transmitting plural types of signals, a first switching circuit having at least two or more switches, the signals from the signal source being supplied to the switches, an analog-signal conversion unit to which outputted signals from the first switching circuit are supplied, and a diagnosis-voltage input unit into which test voltages are inputted. First, the test-voltage values are inputted from the diagnosis-voltage input unit into a multiplexer and an A/D converter which constitute the analog-signal conversion unit, the multiplexer having plural channels, the A/D converter converting outputs from the multiplexer into digital signals, the test-voltage values being different from each other for each channel of the multiplexer. Moreover, comparisons are made between the digital voltage values and the test-voltage values inputted, the digital voltage values being outputted for each channel of the multiplexer. Finally, from this comparison result, it is judged whether the multiplexer is at fault or the A/D converter is at fault.

Namely, in the fault diagnosis apparatus and the fault diagnosis method according to the present invention, the test-voltage values, which are different on each input-channel basis, are inputted into the multiplexer and the A/D converter. Furthermore, the resultant behavior patterns of the multiplexer and the A/D converter are observed. This observation makes it identifiable which of the multiplexer and the A/D converter is at fault, i.e., whether the multiplexer is at fault or the A/D converter is at fault.

According to the present invention, the following effects are accomplished: It becomes possible to extend the fault diagnosis range of the multi-channel analog input/output circuit. Simultaneously, after the occurrence of an abnormality, it becomes easier to identify the failed location. This feature makes it possible to shorten a time which is needed for the necessary part replacement. As a result, MTTR (: Mean Time To Repair) is shortened, which allows successful implementation of the high-reliability system. Also, there is no necessity for configuring a circuit for individually diagnosing the multiplexer, the A/D converter, and the switches. Accordingly, there exists an advantage of reducing the number of the necessary parts, and resulting in implementation of the cost reduction.

Incidentally, the MTTR is a numerical value for indicating an average of the times which are needed for the recovery of a failed system. The MTTR is the value resulting from dividing the repairing times by the number-of-times of faults. This MTTR is used as an indication for the integrity of a system. Namely, the smaller the MTTR becomes, the shorter the time needed up to the recovery becomes. Consequently, it can be said that the system is a high-integrity system at that time.

Other objects, features and advantages of the invention will become apparent from the following description of the embodiments of the invention taken in conjunction with the accompanying drawings.

BRIEF DESCRIPTION OF THE DRAWINGS

FIG. 6A and FIG. 6B are diagrams for illustrating the comparison result among the respective bit strings of the respective channels of the multiplexer in the abnormal state of the A/D converter in the embodiment of the present invention.

DETAILED DESCRIPTION OF THE INVENTION

Figure 1:
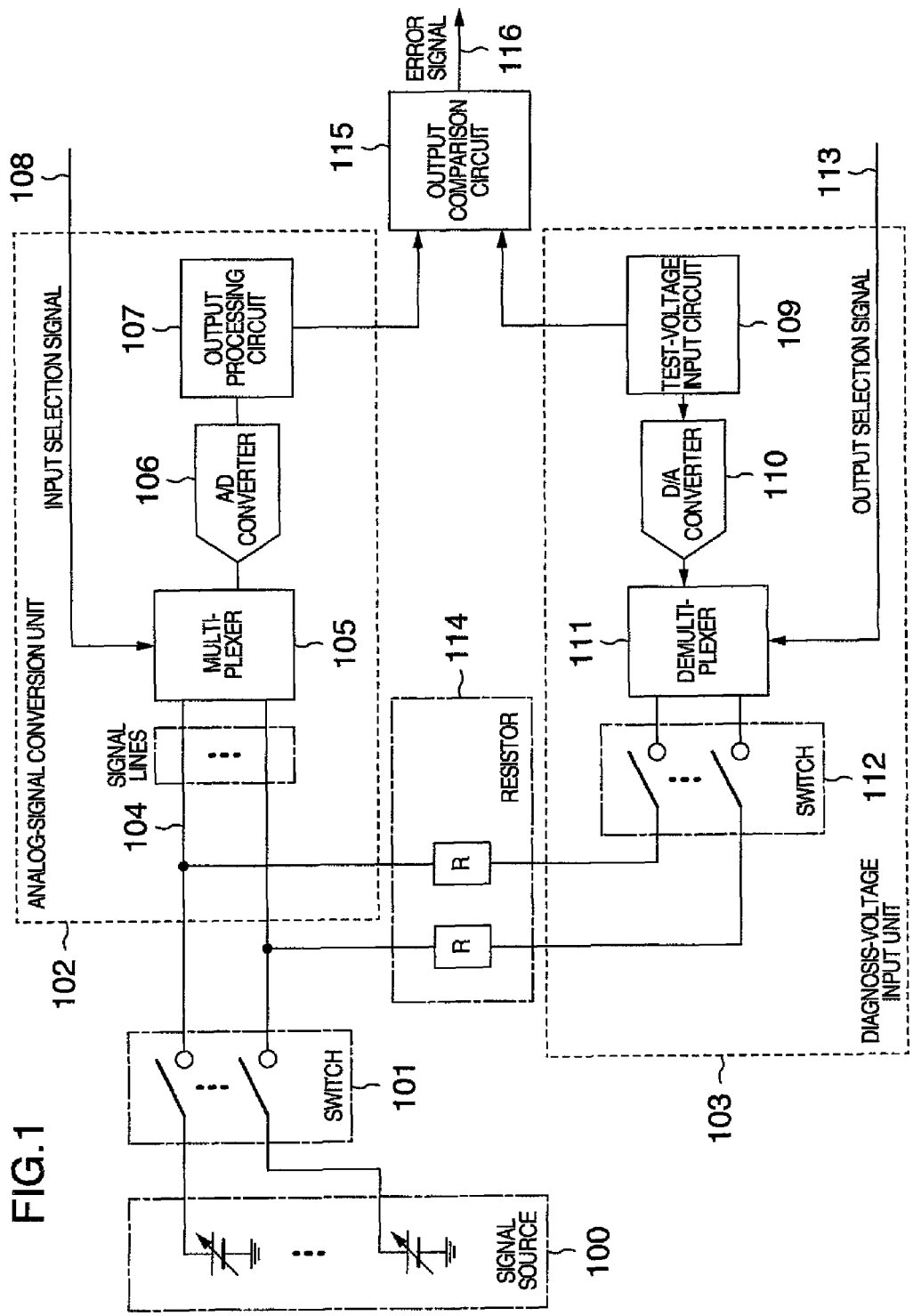
FIG. 1 is a block configuration diagram for illustrating a fault diagnosis apparatus for a multi-channel analog input/output circuit as an embodiment of the present invention.

Hereinafter, referring to the drawings, the explanation will be given below concerning embodiments (which, hereinafter, will be referred to as "present embodiments" in some cases) for carrying out the present invention.

FIG. 1 is a block configuration diagram for illustrating a fault diagnosis apparatus for a multi-channel analog input/output circuit as an embodiment of the present invention. In the present embodiment, the explanation will be given assuming that, for convenience, the number of voltage types generated from a signal source and the number of channels are set at 16 respectively. Namely, the signal source 100 is assumed to generate the 16 types of voltages. Moreover, the explanation will be given setting the associated voltages as follows: The width of these signal-source voltages is equal to 1V to 5V, the inputted analog test-voltage values are equal to 0.5V to 8V, and the lower-limit and upper-limit of the digital voltage values of the test-voltage values are equal to 4000 and 16000 respectively. Actually, however, these numerical values indicate only one example. Namely, the real embodiments are not limited to these numerical values. Consequently, the present invention is not restricted by these numerical values at all.

As illustrated in FIG. 1, the embodiment of the present invention includes the signal source 100, a first switching circuit 101 having 16 units of switches to which the 16 types of signal-source voltages are supplied, an analog-signal conversion unit 102 to which the first switching circuit 101 is connected, and a diagnosis-voltage input unit 103 connected to the analog-signal conversion unit 102 for supplying the test-voltage values.

The analog-signal conversion unit 102 is a circuit for selecting one of the signal-source voltages supplied via the first switching circuit 101, and converting the selected one signal-source voltage into a digital value then to output the digital value. Also, the diagnosis-voltage input unit 103 is a circuit for supplying plural steps of diagnosis-use test-voltage values to the analog-signal conversion unit 102. Here, test-voltage values are subjected to the D/A conversion as will be described later.

The analog-signal conversion unit 102 includes a multiplexer 105 into which the 16-channel signal-source voltages from the signal source 100 are inputted via the first switching circuit 101 and signal lines 104, an A/D converter 106 for converting the outputted analog value from the multiplexer 105 into the digital signal value, and an output processing circuit 107 for processing the outputted digital value from the A/D converter 106. Incidentally, which channel of signal the multiplexer 105 will select out of the 16-channel signals is determined in accordance with an input selection signal 108 supplied from the outside.

Also, the diagnosis-voltage input unit 103 includes a test-voltage input circuit 109 for dividing the 0.5-V to 8-V voltage into the 16 steps to generate the 16-type test-voltage values (digital values), a D/A converter 110 for converting the outputted test-voltage values from the test-voltage input circuit 109 into analog signals, a demultiplexer 111 for distributing the outputted analog signals from the D/A converter 110, and a second switching circuit 112 for supplying the 16-step test-voltage values distributed by the demultiplexer 111. Here, the switching selection of each channel performed in the demultiplexer 111 is determined in accordance with an output selection signal 113 which is synchronized with the input selection signal 108.

The 16-step test-voltage values from the diagnosis-voltage input unit 103 are supplied to the signal lines 104 of the analog-signal conversion unit 102 via a resistor group 114. Also, an output comparison circuit 115 makes the comparisons between outputted digital voltage values from the output processing circuit 107 and the test-voltage values from the test-voltage input circuit 109 of the diagnosis-voltage input unit 103. Moreover, from this comparison result acquired by the output comparison circuit 115, it is judged whether the respective circuits (i.e., multiplexer 105 and A/D converter 106) configuring the analog-signal conversion unit 102 are in the normal or abnormal states. If some abnormality is detected, an error signal 116 is sent from the output comparison circuit 115 to a not-illustrated warning apparatus.

Next, the explanation will be given below concerning the operation of the circuit illustrated in FIG. 1. The connection open/close of the signal-source voltages from the 16-channel signal source 100 can be switched independently for each channel by the first switching circuit 101. Moreover, the multiplexer 105 selects one of these 16 channels, then transmitting the selected one channel to the A/D converter 106. Here, into which channel the multiplexer 105 will make the switching is determined in accordance with the input selection signal 108 inputted from the outside. Furthermore, the analog signal value converted into the digital signal value by the A/D converter 106 is transmitted to the output processing circuit 107. In the output processing circuit 107, the digital value is subjected to the normal processing, then being outputted to the output comparison circuit 115. Incidentally, as described above, the signal-source voltages from the signal source 100 are set such that they change within the range of 1 V to 5 V.

Also, the outputted test-voltage values from the test-voltage input circuit 109 are converted into the analog values by the D/A converter 110. Then, one of the analog values is distributed to any one of the 16-channel outputs by the demultiplexer 111. The switching selection of each channel performed in the demultiplexer 111 is determined in accordance with the output selection signal 113 supplied from the outside. This output selection signal 113 is synchronized with the input selection signal 108 described earlier.

Furthermore, the output channel of the demultiplexer 111 is connected to any one of the switches selected by the second switching circuit 112. In this way, the test-voltage values are supplied from the diagnosis-voltage input unit 103 to the analog-signal conversion unit 102. Also, as described above, the output comparison circuit 115 makes the comparisons between the test-voltage values from the test-voltage input circuit 109 and the digital voltage values. Here, the digital voltage values are generated in the above-described process that the test-voltage values are outputted from the output processing circuit 107 via the analog-signal conversion unit 102. In addition, from this comparison result, the abnormality judgment on the analog-signal conversion unit 102 is made.

In the fault diagnosis apparatus for the multi-channel analog input/output circuit configured as illustrated in FIG. 1, at the ordinary time, the first switching circuit 101 is switched ON. Accordingly, the signals from the signal source 100 are supplied to the A/D converter 106 via the multiplexer 105. Moreover, the analog values from the multiplexer 105 are converted into the digital values by the A/D converter 106.

Meanwhile, at the time of the fault-diagnosis operation, the first switching circuit 101 is set OFF, and the second switching circuit 112 is set ON. Furthermore, the test-voltage values from the diagnosis-voltage input unit 103 are supplied to the multiplexer 105. Incidentally, when performing the fault-diagnosis operation, voltage values which are different from each other for each channel of the multiplexer 105 are set as the test-voltage values. Then, these different voltage values are inputted in such a manner that the channels are sequentially switched by the demultiplexer 111.

Next, based on a flowchart illustrated in FIG. 2, the explanation will be given below concerning an operation which becomes the precondition for the case where the fault detection is performed with respect to the multiplexer 105 and the A/D converter 106 of the analog-signal conversion unit 102. Simultaneously, the explanation will be given below regarding the fault diagnosis of the respective circuits of the analog-signal conversion unit 102.

First, when trying to perform the fault detection of the analog-signal conversion unit 102, it is necessary to check the integrity of the first switching circuit 101 in advance. Namely, it is necessary to diagnose the ON-stuck or OFF-stuck state of the first switching circuit 101 in advance. The flowchart illustrated in FIG. 2 indicates the processing steps needed for this check.

Figure 2:
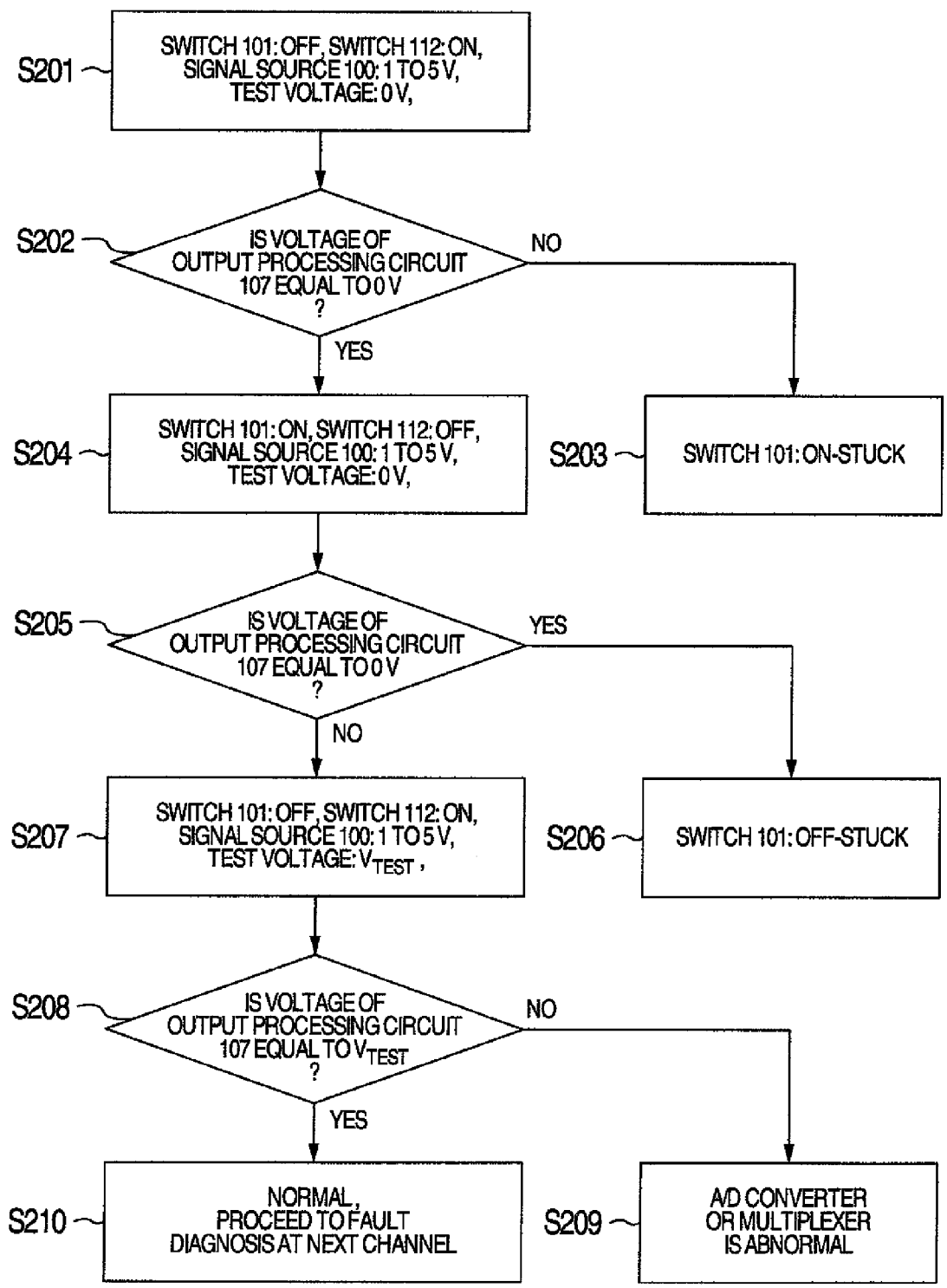
FIG. 2 is a flowchart for explaining the operation of ON/OFF-stuck diagnosis of circuit-side switches, and the operation of fault diagnosis of the circuit in the embodiment of the present invention.

As illustrated in FIG. 2, hereinafter, the explanation will be given describing the first switching circuit 101 as "switch 101" and the second switching circuit 112 as "switch 112".

First of all, the flow for checking the ON-stuck state and OFF-stuck state of the switch 101 will be explained. First, the switch 101 is brought into the OFF state, and the switch 112 is brought into the ON state. Next, a 1-V to 5-V signal-source voltage is supplied from the signal source 100, and a 0-V voltage is inputted from the test-voltage input circuit 109 (step S201).

Moreover, it is judged whether or not the output from the output processing circuit 107 of the analog-signal conversion unit 102 "is equal to 0 V" (step S202). At this judgment step S202, if it is judged that the 0-V voltage inputted from the test-voltage input circuit 109 is outputted from the output processing circuit 107 (: Yes at step S202), it is judged that the switch 101 is normally opened, i.e., the switch 101 is in the OFF state. In other words, it is judged that the switch 101 is not in the ON-stuck state. Accordingly, the operation proceeds to the next step S204.

Meanwhile, at the judgment step S202, if it is judged that the output from the output processing circuit 107 becomes equal to a value other than 0 V (: No at step S202), there is a possibility that the output from the signal source 100, which should not be essentially outputted from the actual situation, is outputted from the output processing circuit 107 by way of the switch 101. Namely, it turns out that there is a high possibility that the switch 101 is not brought into the OFF state, but is brought into the ON state. In the case like this, it is judged that the switch 101 is in the ON-stuck state (step S203).

At the judgment step S202, if it has been judged that the switch 101 is not in the ON-stuck state, subsequently, it must be judged whether or not the switch 101 is in the OFF-stuck state. Accordingly, the switch 101 is switched into the ON state, and the switch 112 is switched into the OFF state. Next, the 1-V to 5-V signal-source voltage is supplied from the signal source 100, and the test voltage from the test-voltage input circuit 109 is set at 0 V (step S204).

Furthermore, it is judged again whether or not the outputted voltage from the output processing circuit 107 of the analog-signal conversion unit 102 "is not equal to 0 V" (step S205). At this judgment step S205, if it is judged that the output from the output processing circuit 107 is not equal to 0 V (: Yes at step S205), it can be recognized that the input from the signal source 100 is outputted by way of the switch 101. Namely, it can be judged that the switch 101 operates normally, and that the switch 101 is not in the OFF-stuck state.

Meanwhile, at the judgment step S205, if it is judged that the 0-V voltage is outputted from the output processing circuit 107 (: Yes at step S205), there is a high possibility that the switch 101 is not connected to the signal source 100. Namely, it can be judged that the switch 101 is not brought into the ON state, but is brought into the OFF state, i.e., the switch 101 is in the OFF-stuck state (step S206).

At the judgment step S205, if it has been judged that some signal, which is not equal to 0 V, is outputted from the output processing circuit 107, subsequently, it is judged whether or not the circuits configuring the analog-signal conversion unit 102 are operating normally. Namely, it turns out that the abnormality detection of the circuits will be performed in the state where the switch 101 is neither in the ON-stuck state nor in the OFF-stuck state.

Accordingly, this time, the switch 101 is switched into the OFF state, and the switch 112 is switched into the ON state. Moreover, the signal from the signal source 100 is left unchanged and remains in the foregoing state with no change added thereto, and 16-step test voltages Vtest are generated from the test-voltage input circuit 109 (step S207). In addition, it is judged whether or not, in this state, voltages whose values are equal to the inputted test voltages Vtest are outputted as the outputs from the output processing circuit 107 (step S208).

At this judgment step S208, if it is judged that the voltage values which are equal to the test voltages Vtest are outputted from the output processing circuit 107 (: Yes at step S208), i.e., if, speaking with the description of the circuits illustrated in FIG. 1, the error signal 116 is not outputted from the output comparison circuit 115 at all the steps of the 16-step test voltages Vtest, it is judged that all the circuits of the analog-signal conversion unit 102 are operating normally (step S210).

At the judgment step S208, however, if it is judged that a voltage value other than the test voltages Vtest is outputted from the output processing circuit 107 (: No at step S208), it is judged that some abnormality has occurred in the circuits configuring the analog-signal conversion unit 102, i.e., in the A/D converter 106 or in the multiplexer 105 (step S209).

Nevertheless, the fault diagnosis based on only a single channel is not sufficient to be able to judge whether the multiplexer 105 has failed or the A/D converter 106 has failed. Consequently, the identification of the failed location is made possible by supplying the test voltages Vtest via the 16 units of channels, and diagnosing all the outputs from the 16 units of channels.

Next, based on FIG. 3 to FIG. 5 and FIG. 6A and FIG. 6B, the explanation will be given below concerning a normal state where no fault exists and an abnormal state where some fault exists in such a manner that the comparison is made between the normal state and the abnormal state in the fault diagnosis apparatus and the fault diagnosis method of the present embodiment.

Figure 3:
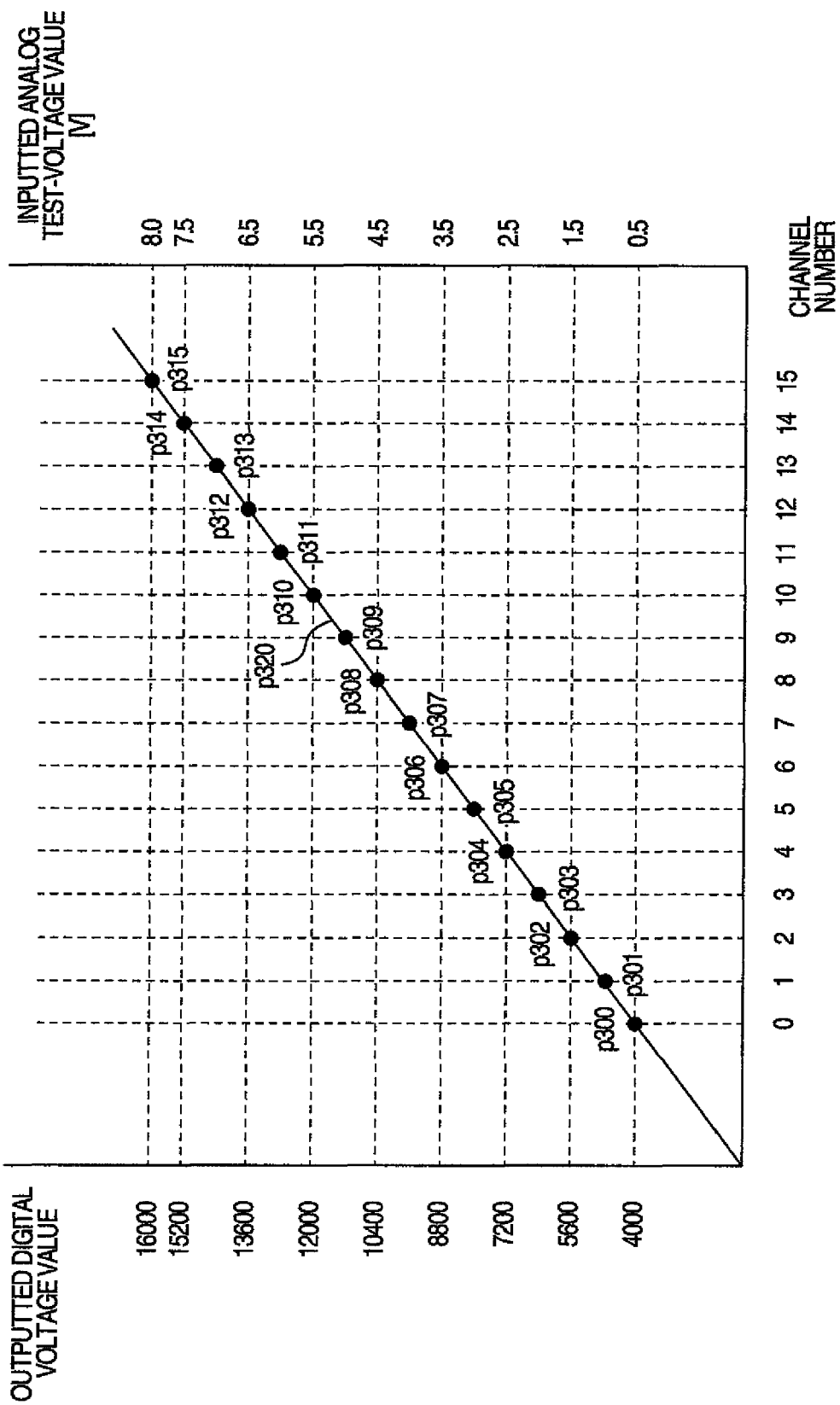
FIG. 3 is a diagram for illustrating the comparison result between the outputted digital voltage values from the respective channels of the multiplexer and the inputted test-voltage values in the normal state in the embodiment of the present invention.

FIG. 3 illustrates an example of the case where all the circuits configuring the present embodiment are operating normally. The horizontal axis indicates the channel numbers of the respective channels to which the inputted test-voltage values are supplied. The 0.5-V to 8-V test-voltage values are supplied to the respective channels. Meanwhile, the left side of the vertical axis in FIG. 3 indicates the digital voltage values acquired as a result of the digital conversion of the inputted analog test-voltage values by the A/D converter 106 and outputted from the output processing circuit 107. The right side of the vertical axis in FIG. 3 indicates the inputted analog test-voltage values before being digital-converted by the A/D converter 106.

As illustrated in FIG. 3, the inputted test-voltage values applied to the respective channels 0 to 15 and the outputted digital voltage values from the A/D converter 106 are in a proportional relationship with each other. A solid line p320 indicates a line which is acquired by connecting the 16 units of digital voltage values inputted from the test-voltage input circuit 109.

Points p300 to p315 indicate the digital voltage values inputted into the output processing circuit 107 from the respective channels 0 to 15 via the multiplexer 105 and the A/D converter 106.

As is shown from FIG. 3, all of the points p300 to p315 exist on the solid line p320. Judging from this fact, it can be confirmed that the multiplexer 105 and the A/D converter 106 are operating normally.

Next, based on FIG. 4, the explanation will be given below regarding a case where the multiplexer 105 is at fault. The explanation of the horizontal axis and vertical axis is the same as the one in FIG. 3, and thus will be omitted. Also, a solid line p420 in FIG. 4, which is the same as the solid line p320 in FIG. 3, is the line acquired by connecting the 16 units of digital voltage values inputted from the test-voltage input circuit 109.

Figure 4:
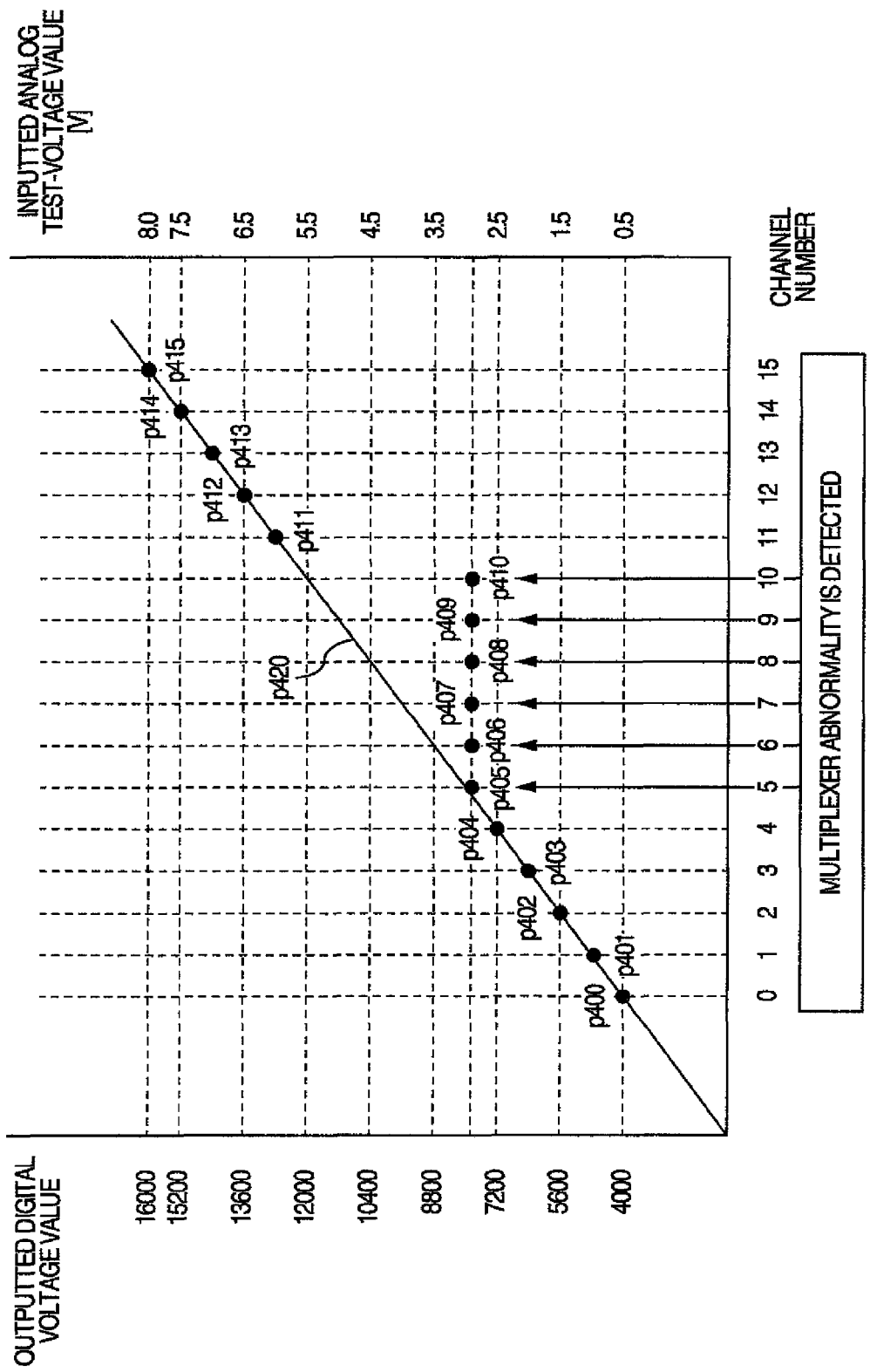
FIG. 4 is a diagram for illustrating the comparison result between the outputted digital voltage values from the respective channels of the multiplexer and the inputted test-voltage values in an abnormal state of the multiplexer in the embodiment of the present invention.

In FIG. 4 as well, points p400 to p415 indicate the digital voltage values inputted into the output processing circuit 107 from the respective channels 0 to 15 via the multiplexer 105 and the A/D converter 106.

As illustrated in FIG. 4, the points p400 to p405 and the points p411 to p415 exist on the solid line p420. The points p406 to p410, however, do not exist on the solid line p420. Namely, the points p406 to p410 have a digital voltage value which is equal to 8000 of the digital voltage value of the point p405. Since the inputted test-voltage values are changed for each channel, the outputted digital voltage values corresponding thereto, naturally, should be different for each channel. In the case illustrated in FIG. 4, however, it can be recognized that the one and the same value appears at the plural channels.

This phenomenon means that the selection of the inputted test-voltage signals performed by the multiplexer 105 is not performed normally. Namely, it is conceivable that a stuck state is present at the channel number 5 of the point p405. Consequently, it can be judged that the multiplexer 105 is at fault.

Figure 5:
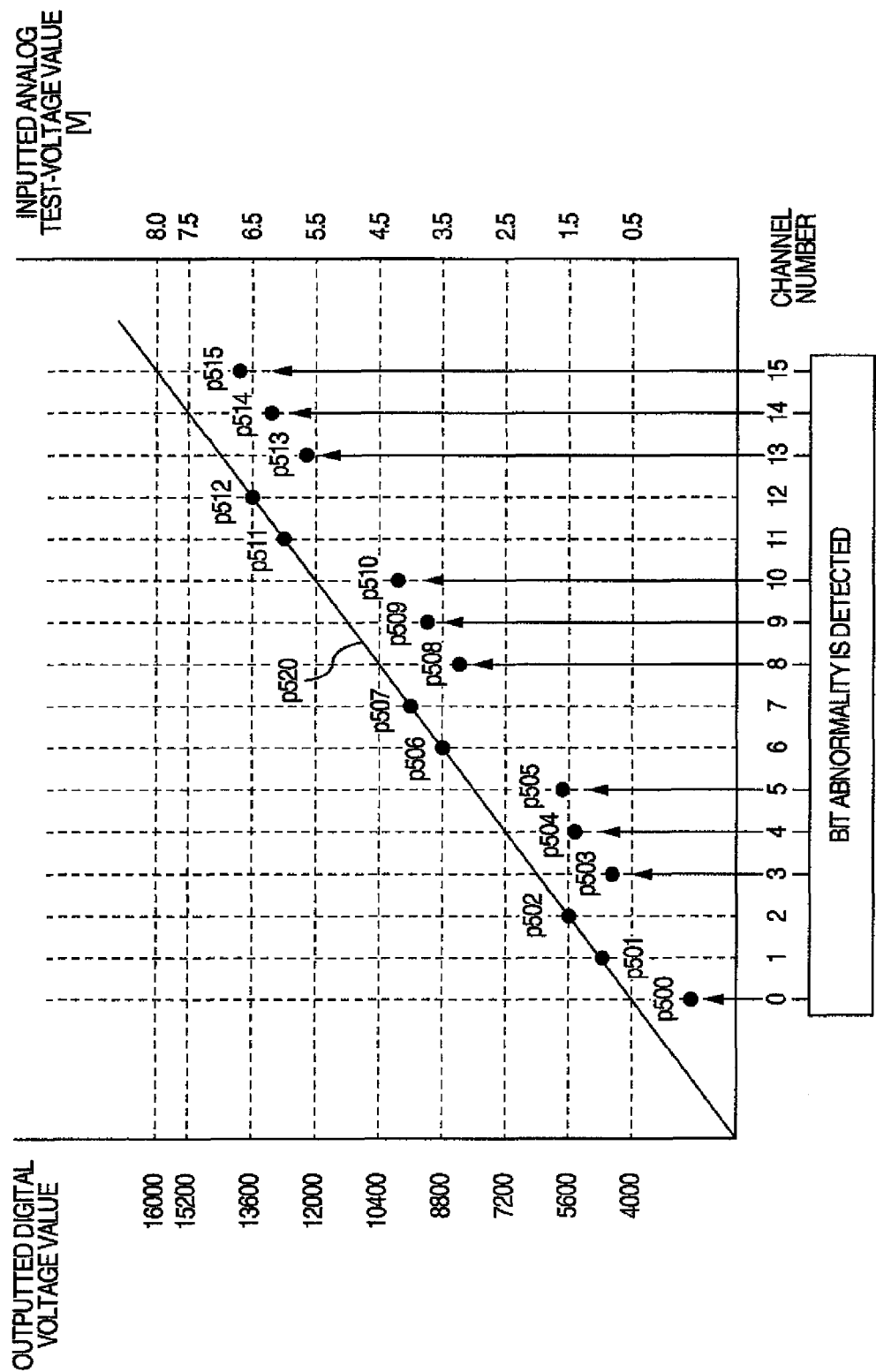
FIG. 5 is a diagram for illustrating the comparison result between the outputted digital voltage values from the respective channels of the multiplexer and the inputted test-voltage values in an abnormal state of the A/D converter in the embodiment of the present invention.

Next, based on FIG. 5, the explanation will be given below regarding a case where the A/D converter 106 is at fault. The explanation of the horizontal axis and vertical axis is the same as the ones in FIG. 3 and FIG. 4, and thus will be omitted. Also, a solid line p520 in FIG. 5 is the same as the solid lines p320 and p420 illustrated in FIG. 3 and FIG. 4. Also, as is the case with FIG. 3 and FIG. 4, points p500 to p515 illustrated in FIG. 5 indicate the digital voltage values inputted into the output processing circuit 107 from the respective channels 0 to 15 via the multiplexer 105 and the A/D converter 106.

As illustrated in FIG. 5, all of the points do not exist on the solid line p520, but some points shift below in the downward direction from the solid line p520. Namely, it can be recognized that the points that exist on the solid line p520 are only the six points, i.e., p501, p502, p506, p507, p511, and p512, and that the other points do not exist on the solid line p520. This phenomenon is a one which differs from the phenomenon illustrated in FIG. 4 in the case where the multiplexer 105 is at fault.

Accordingly, FIG. 6A and FIG. 6B illustrate results which are obtained by converting the digital voltage values acquired in FIG. 5 into bit strings, and arranging these bit strings in sequence. The 0.5-V to 8-V test-voltage values are applied to the respective channels 0 to 15 such that the test-voltage values are gradually increased by the amount of 0.5 V. The digital voltage values are represented as being "4000" to "16000", which are acquired as a result of the digital conversion by the A/D converter 106 in correspondence with the inputted analog test-voltage values applied to the respective channels. FIG. 6A and FIG. 6B illustrate the 14-bit bit strings that correspond to these 4000 to 16000 values. FIG. 6A illustrates the bit strings of a normal state, e.g., the state as illustrated in FIG. 3; whereas FIG. 6B illustrates the bit strings of an abnormal state, e.g., the state as illustrated in FIG. 5 where the abnormal output is present.

Now, of the bit strings illustrated in FIG. 6A and FIG. 6B, attention is focused on the higher-order 3rd bit strings from the above (i.e., 12th bit strings from the below, which are the portions surrounded by frames 601 and 602 in FIG. 6A and FIG. 6B respectively). In FIG. 6A where the normal state is illustrated, the higher-order 3rd bit string becomes "1, 0, . . . , 1, 1" in correspondence with the 16 units of respective channels "0, 1, . . . , 14, 15". In contrast thereto, in FIG. 6B where the abnormal state is illustrated, the higher-order 3rd bit string becomes "0, 0, . . . , 0, 0" in correspondence therewith. Namely, the following phenomenon can be confirmed: In the normal state, the higher-order 3rd bit string assumes the different values depending on each channel, such as "0" or "1". In contrast thereto, in the abnormal state, the higher-order 3rd bit string assumes "0" at all the channels.

This phenomenon means that the bits are stuck at "0", despite the fact that, originally, the bits should be able to assume both "0" and "1". In other words, this phenomenon means that, when the A/D converter 106 has converted the analog test-voltage values to the digital voltage values, the A/D converter 106 has found it impossible to perform this conversion accurately, i.e., the A/D converter 106 has been at fault. Namely, at the higher-order 3rd bit strings, the bits that, originally, should be equal to "1" have become equal to "0". Speaking with the presentation in FIG. 6A and FIG. 6B, this phenomenon means that the bits have decreased by the same number, which eventually means that the points have shifted below by the constant amount.

Incidentally, here, there is a problem of with what number of bit strings the abnormality detection of the A/D converter 106 should be performed. Usually, it is preferable that the higher-order bit strings, e.g., the higher-order substantially 1st to 10th bit strings, be compared with each other for each of the 16-step test-voltage values. This is because, in some cases, all of the 3rd to 4th bit strings from the below become equal to "0" even in the normal state.

As having been explained in FIG. 3 to FIG. 5 and FIG. 6A and FIG. 6B, according to the present embodiment, the inputted 16-step test-voltage values from the diagnosis-voltage input unit 103 are supplied to the analog-signal conversion unit 102. Next, the comparisons are made between the inputted test-voltage values and the outputted digital voltage values corresponding thereto. This method makes it possible to simultaneously detect the abnormalities of the multiplexer 105 and the A/D converter 106 which configure the multi-channel analog input/output circuit. Moreover, at the time of the abnormality detection, the error signal 116 is generated from the output comparison circuit 115, thereby issuing some warning to the supervisor or operator of process facilities such as a plant.

In the foregoing description, based on FIG. 1 to FIG. 6A and FIG. 6B, the explanation has been given concerning the embodiments of the present invention. It is needless to say, however, that the present invention is not limited to the above-described embodiments, and that the present invention includes a variety of modification and application examples within the range of not departing from the sprit of the invention disclosed in the scope of the appended claims.

The invention claimed is:

1. A fault diagnosis apparatus for a multi-channel analog input/output circuit, comprising:
a signal source for generating and transmitting plural types of signals;
a first switching circuit having at least two or more switches, said signals from said signal source being supplied to said switches;
an analog-signal conversion unit to which said outputted signals from said signal source are supplied via said first switching circuit; and
a diagnosis-voltage input unit into which test voltages are inputted, wherein
said analog-signal conversion unit, further comprises:
a multiplexer to which said outputted signals from said signal source are supplied via said first switching circuit, said multiplexer having channels whose number is equal to said number of said plural switches that said first switching circuit has;

an analog/digital converter to which signals from said multiplexer are supplied; and an output processing circuit to which outputs from said analog/digital converter are supplied, said diagnosis-voltage input unit, further comprising:

a test-voltage input circuit;

a digital/analog converter to which said test voltages from said test-voltage input circuit are supplied;

a demultiplexer to which analog signals from said digital/analog converter are supplied, said demultiplexer having plural output channels; and a second switching circuit having switches connected to said demultiplexer, number of said switches being equal to at least number of said output channels of said demultiplexer, and wherein, when said fault diagnosis is performed, analog test voltages from said demultiplexer are supplied as inputs into said respective channels of said multiplexer of said analog-signal conversion unit via said respective switches of said second switching circuit.

2. The fault diagnosis apparatus according to claim 1, wherein an input selection signal for selecting an input to be inputted into said multiplexer is supplied to said multiplexer, an output selection signal being supplied to said demultiplexer in order to select an output to be outputted from said demultiplexer, said output selection signal being synchronized with said input selection signal.

3. A fault diagnosis method for a multi-channel analog input/output circuit including: a signal source for generating and transmitting plural types of signals; a first switching circuit having at least two or more switches, said signals from said signal source being supplied to said switches; an analog-signal conversion unit to which outputted signals from said first switching circuit are supplied; and a diagnosis-voltage input unit into which test voltages are inputted, said fault diagnosis method, comprising the steps of:

inputting said test-voltage values from said diagnosis-voltage input unit into a multiplexer and an A/D converter which constitute said analog-signal conversion unit, said multiplexer having plural channels, said A/D converter converting outputs from said multiplexer into digital signals, said test-voltage values being different from each other for each channel of said multiplexer; and judging whether said multiplexer is at fault or said A/D converter is at fault by making comparisons between said digital voltage values and said test-voltage values inputted, said digital voltage values being outputted for each channel of said multiplexer.

4. A fault diagnosis method for a multi-channel analog input/output circuit which includes a signal source for generating and transmitting plural types of signals, an analog-signal conversion unit and a diagnosis-voltage input unit, said analog-signal conversion unit including: a first switching circuit having at least two or more switches, said signals from said signal source being supplied to said switches; a multiplexer having plural input channels, said outputted signals from said signal source being supplied to said input channels via said first switching circuit; an analog/digital converter for converting analog signals from said multiplexer into digital signals; and an output processing circuit to which said digital signals from said analog/digital converter are supplied, said diagnosis-voltage input unit including: a test-voltage input circuit for generating plural test voltages; a digital/analog converter into which said test voltages are inputted; a demultiplexer into which outputs from said digital/analog converter are inputted, said demultiplexer having plural output channels; and a second switching circuit to which outputs from said demultiplexer are supplied, said fault diagnosis method, comprising:

a first step of setting each switch of said second switching circuit ON in a state where each switch of said first switching circuit is set OFF, and causing said plural voltages to be generated from said signal source in a state where said test voltages are fixed at 0 V;

a second step of judging whether or not output voltages from said output processing circuit are equal to 0 V in said set states at said first step;

a third step of judging that said switches configuring said first switching circuit are in ON-stuck states, if, at said second step, it is judged that said output voltages from said output processing circuit are not equal to 0 V;

a fourth step of setting each switch of said second switching circuit OFF in a state where each switch of said first switching circuit is set ON, and causing said plural voltages to be generated from said signal source in said state where said test voltages are fixed at 0 V, if, at said second step, it is judged that said output voltages from said output processing circuit are equal to 0 V;

a fifth step of judging whether or not said output voltages from said output processing circuit are equal to 0 V in said set states at said fourth step;

a sixth step of judging that said switches configuring said first switching circuit are in OFF-stuck states, if, at said fifth step, said output voltages from said output processing circuit are equal to 0 V;

a seventh step of setting each switch of said second switching circuit ON in said state where each switch of said first switching circuit is set OFF, and switching said test voltages into plural steps, and causing said plural voltages to be generated from said signal source, if, at said fifth step, it is judged that said output voltages from said output processing circuit are not equal to 0 V;

an eighth step of judging whether or not said output voltages from said output processing circuit are equal to said test voltages in said set states at said seventh step, said test voltages being inputted such that said test voltages are switched into said plural steps;

a ninth step of judging that said multiplexer or said analog/digital converter in said multi-channel analog input/output circuit is not operating normally, if, at said eighth step, it is judged that said output voltages from said output processing circuit are not equal to said test voltages inputted; and a tenth step of judging that said multi-channel analog input/output circuit is operating normally, if, at said eighth step, it is judged that said output voltages from said output processing circuit are equal to said test voltages inputted.

* * * * *